United States Patent [19]

Myers

[11] 4,192,526

[45] Mar. 11, 1980

[54] TRAILER HITCH GUIDING DEVICE

[76] Inventor: Casper E. Myers, 1601 Palm Way, Largo, Fla. 33541

[21] Appl. No.: 944,787

[22] Filed: Sep. 22, 1978

[51] Int. Cl.² .................................................. G01C 5/00
[52] U.S. Cl. ......................................... 280/477; 33/264
[58] Field of Search .......................... 280/477; 33/264; 116/28 R

[56] References Cited

U.S. PATENT DOCUMENTS

| | | | |
|---|---|---|---|
| 2,815,732 | 12/1957 | Majors | 116/28 R |
| 3,159,917 | 12/1964 | Whitehead | 33/264 |
| 3,363,318 | 1/1968 | Folkins | 33/264 |
| 3,765,703 | 10/1973 | Voelkerding | 280/477 |
| 3,774,149 | 11/1973 | Bennett | 280/477 |
| 3,818,599 | 6/1974 | Tague | 33/264 |
| 3,858,966 | 1/1975 | Lowell | 280/477 X |
| 3,867,898 | 2/1975 | Lakamp | 116/28 R |
| 3,889,384 | 6/1975 | White | 33/264 |
| 3,901,536 | 8/1975 | Black | 280/477 |
| 3,918,746 | 11/1975 | Lehtisaari | 280/477 |

*Primary Examiner*—John A. Pekar
*Attorney, Agent, or Firm*—William A. Newton

[57] ABSTRACT

Disclosed is a hitch guide assembly comprising a target post vertically positioned above a socket member of a towed vehicle and sighting means vertically positioned above a ball member of a towing vehicle. The sighting means comprises a V-shaped mounting bracket which magnetically couples to the towing vehicle and has an extension arm pivotally attached to the mounting bracket. The sighting means further includes a guide pointer which may be selectively positioned along the extension arm so that, when combined with the pivoted adjustment of extension arm, the outer end portion of the guide pointer is substantially positioned over the coupling member of the towing vehicle.

10 Claims, 4 Drawing Figures

TRAILER HITCH GUIDING DEVICE

FIELD OF THE INVENTION

The present invention relates to guide and sighting devices mounted on a towing vehicle and a towed vehicle for the purpose of cooperatively aligning members of a hitch assembly.

DESCRIPTION OF THE PRIOR ART

In coupling a towing vehicle, such as an automobile or a truck, to a towed vehicle, such as a trailer or a camper, it is a common practice to use a hitch assembly having a ball mounted on the rear of the towing vehicle and a socket on the front of the towed vehicle. The towing vehicle must normally be backed up one or more times so as to position the ball beneath the socket. Once this alignment is attained, the socket can be lowered to fit over the ball, thereby coupling the two vehicles together.

This coupling or hook-up operation has proven to be particularily difficult to even a skillful driver. This is particularily true when only one person is involved in effecting such an operation. The driver of the towing vehicle must make an initial estimate of the intended proper position of the towing vehicle in relation to the towed vehicle and then make a blind maneuver in hopes of ultimately reaching such a position. Generally, the ball is never visible to the operator or driver and as the towing vehicle approaches the towed vehicle, the socket is also normally not visible. Both longitudinal and lateral alignment must be accomplished with the hitch assembly to avoid having the driver stop the towing vehicle and lift the trailer to set the socket over the ball. Moreover, if the vehicle is backed up too far so as to overshoot its mark, collision may occur between the two vehicles. To a limited degree some of these problems may be overcome by having an attendant or second person available for assisting in the hook-up operation. However, such an attendant may not be available or may prove to be ineffective in assisting the driver.

The above described difficulties have long been recognized in the prior art. Consequently, various devices exist in the prior art to overcome the difficulties arising when one attempts to position a hitch ball beneath a socket as shown by U.S. Pat. Nos. 3,818,599, 3,901,536, 2,815,732, 3,765,703, 3,159,917, 3,363,318, 3,918,746, 3,889,384, 3,867,898, 3,858,966, and 3,774,149. Although these various prior art schemes have overcome some of the heretofore described problems, such schemes suffer from certain drawbacks which will now be described.

In general, the devices of the prior art cannot be easily and quickly mounted or removed from the vehicles. Normally such devices require some type of locking arrangement to secure the same to the vehicles. Moreover, alignment of the prior art guide devices when securing the same may prove difficult and time consuming. Also, the many different designs and configurations of hitch assemblies and trunk configurations of the towing vehicles severely limit the use of the prior art hitch assemblies to only a relatively few vehicles or hitches.

Although most of the prior art guide assemblies utilize two protruding members to indicate that the ball is beneath the socket, such guide assemblies fail to give a readily discernable signal as to when such alignment has been achieved. Moreover, such prior art guide assemblies prove to be ineffective when the towing vehicle approaches the vehicle to be towed at an angle.

The vast majority of the prior art hitch assemblies are extremily elaborate structures to manufacture and therefore are expensive to manufacture. Moreover, most of these structures are inflexible in nature, leading them to be frequently damaged under adverse conditions.

Accordingly, it can be readily seen that there is a need in this area for a guide hitch assembly which is simple, adaptable to a wide range of vehicles and hitches, provides a readily discernable signal when alignment is accomplished, inexpensive to manufacture and maintain, and yet sufficiently durable and strong for continued use under adverse conditions.

SUMMARY

The present invention is directed toward a hitch guide assembly which provides a visual aid in vertically aligning a first coupling member, normally a ball, of a towing vehicle with a second coupling member, normally a socket, of a towed vehicle. The hitch guide assembly comprises a target post mounted to the towed vehicle with an upper end portion centered above the coupling member of the towed vehicle. The hitch guide assembly further comprises a sighting means including a V-shaped mounting bracket for magnetically mounting the sighting means to the towing vehicle. The sighting means further comprises a pivotally connected extension arm capable of being adjustably rotated in a plane disposed in substantially perpendicular relationship to the plane of the mounting bracket. Movably positionable along the extension arm in an outward extending guide pointer which may be locked into a selected fixed position. By pivoting the extension arm to a selected position and sliding the guide pointer to a selected position, the two manipulations result in the end portion of the guide pointer being substantially vertically disposed over the coupling member located on the towing vehicle. Consequently, when the two coupling members are aligned, the relative closeness on actual contact of the guide pointer and the upper portion of the target post will provide a visual indication of the desired alignment.

BRIEF DESCRIPTION OF THE DRAWINGS

Further objects and advantages of the present invention will become apparent as the following description proceeds, taken in conjunction with the accompanying drawings in which.

DETAILED DESCRIPTION OF THE PREFERRED EMBODIMENTS

Figure 1:
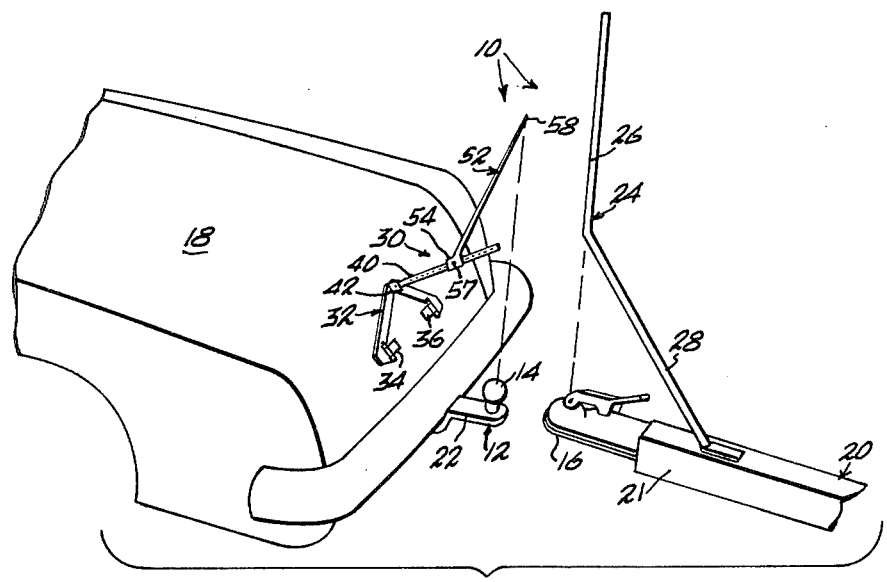
FIG. 1 is a fragmentary perspective view of the present invention with a sighting means mounted on the back of a towing vehicle.

There is disclosed a vehicle guide assembly, generally indicated as 10 in FIG. 1, for visually aiding in the vertical alignment of the mating portions of a hitch 12. The hitch 12 comprises two coupling members, a ball member 14 and a socket member 16, such coupling members being dimensioned and configured for mating engagement so as to couple a towing vehicle 18 to a towed vehicle 20. Normally, but not necessarily, the socket member 16 will be mounted on a socket carrying tongue 2 positioned on the front of the towed vehicle. Likewise, it is common practice to mount the ball member 14 on a ball carrying arm 22 positioned at the rear of the towing vehicle 18. By virtue of this arrangement, the rear of the towing vehicle 18 is normally hooked-up to the front of the towed vehicle 20. However, it has now become commonplace to have a ball member 14 mounted on the front of the towing vehicle 18 so as to better guide such towed vehicles as boats into the water. Consequently, it should be appreciated that the vehicle guide assembly 10, to be described hereinafter, may be used on a towing vehicle with the ball member 14 attached by means of the ball carrying arm 22 to either the front or rear of the towing vehicle. For clairty and to simplify the description of the present invention, the ball carrying arm 22 is shown mounted only on the rear of the towing vehicle 18.

As depicted in FIG. 1, a target post 24 is mounted on the front of the towed vehicle 20 so that an upper end portion 26 is vertically centered above the socket member 16. In other words, the socket member 16 is positioned beneath the upper end portion 26 so that the vertically disposed, longitudinal axis of the upper end portion 26 centrally intersects the socket member 16. This upper end portion 26 is extended upward a sufficient length so as to be continuously visable to the driver of the towing vehicle 18. The lower portion 28 of the target post 24 is mounted to an appropriate location on the towed vehicle 20. In the preferred embodiment illustrated in FIG. 1 the lower portion 28 is mounted on the tongue 21.

Figure 2:
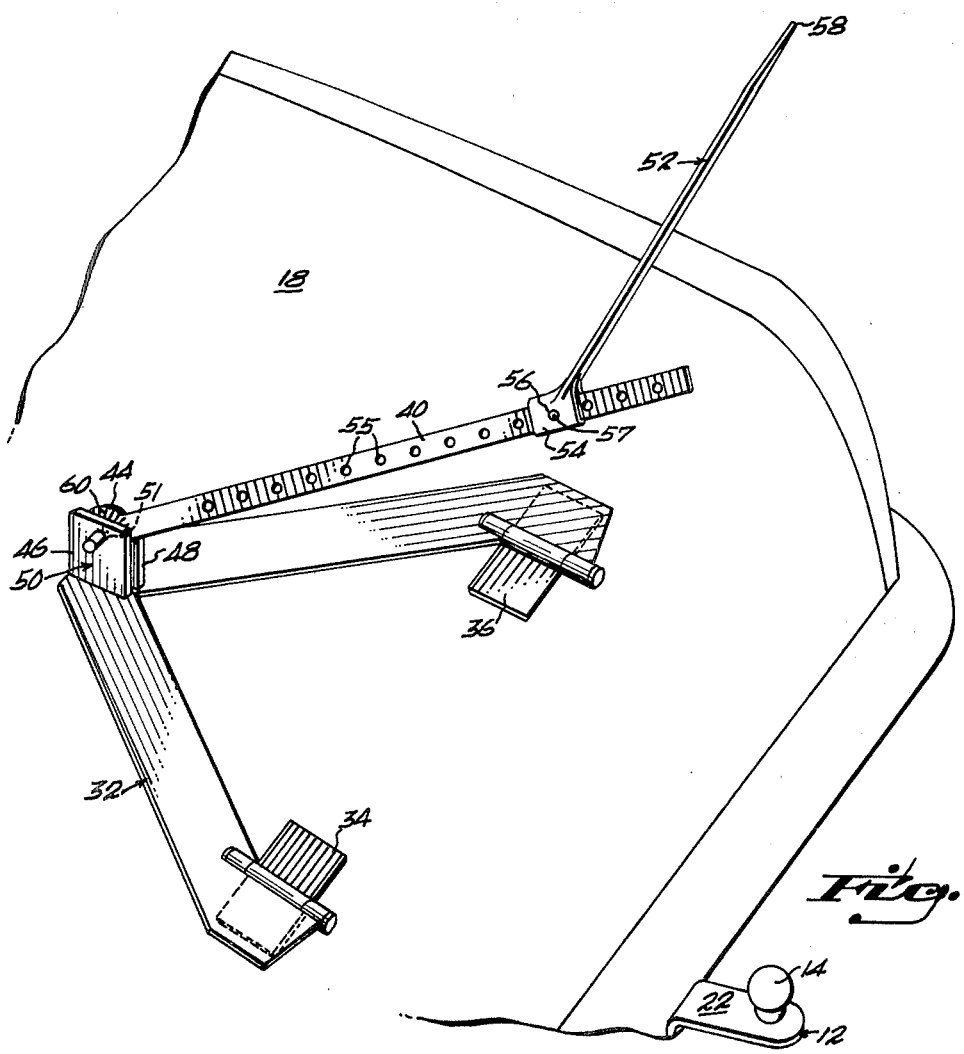
FIG. 2 is an enlarged fragmentary view showing the sighting means mounted on the trunk lid of the towing vehicle.

As shown in FIG. 2, a first embodiment of the sighting means 30 includes a V-shaped mounting bracket 32 having a pair of magnetic fastener means 34 and 36 disposed on opposite ends of the V-shaped mounting bracket 32. Each fastener means 34 and 36 comprises a magnet having a sheet-like configuration pivotally secured to the mounting bracket 32 along a pivotal axis which is parallel to a line bisecting the angle formed by the V-shaped mounting bracket 32. By virtue of this structure, the mounting bracket 32 may be mounted on the rear or front of a towing vehicle 18 even though the surface upon which mounting occurs is not flat. More specifically, the mounting bracket 32 may be detachably secured, for example, to the back of the trunk of an automobile as illustrated in FIG. 1 or on the hood lid as shown in FIG. 2 or on the front of the automobile (not shown). Likewise, the mounting bracket 32 could be attached to the tail gate of a truck (not shown). Consequently, the V-shaped configuration of the mounting bracket 32, when combined with the pivotal attachment of the fastener means 34 and 36, allows the sighting means 30 to be mounted on a variety of positions on the towing vehicle 18 and is particularily adaptable to a protuding outward, V-shaped front or back of the towing vehicle 18.

Referring to FIG. 2, the sighting means 30 further includes an extention arm 40 which is pivotally mounted to the apex or vertex 42 of the mounting bracket 32. More specifically, the extention arm 40 preferably has an enlarged, circular end portion 44 which is positoned between two prongs 46 and 48 of an upright support bracket 50 which is rigidly secured to the vertex 42 of the mounting bracket 32. An aperture 51 is centrally formed in the end portion 44 so that the same may be pivotally secured to the support bracket 50. The two prongs 46 and 48 apply a sufficient frictional force to the extension arm 40 that the same will remain in a selected position; but, on the other hand, may be manually adjusted to other angular positions relative to the mounting bracket 32. A pointer guide 52 is slidingly secured to the extension arm 40 by means of a jacket end portion 54 which is dimensioned and configured to slidingly receive in fitted engagement the arm extention 40. In this manner, the pointer guide may be selectively adjusted along the longitudinal dimensions of the extention arm 40. Moreover, a plurality of holes 55 are ideally provided in the extention arm 40 to be correspondingly aligned with a hole 56 in the jacket end portion 54 so as to allow the penetration of a pin 57 for securing the pointer guide 52 in a fixed, selected position with respect to the extension arm 40. By using the extension arm 40 in combination with the pointer guide 52 in a manner set out above, the sighting means 30 may be used on a wide variety of towing vehicles 18 as will be described hereinafter.

It should be understood that with the numerous commerical hitch assemblies available in the present marketplace, there can be a relatively large variance in the distance between the location of the ball member 14 and the back of the towing vehicle 18. Moreover, the back of the towing vehicle 18 may be obstructed so as to prevent the mounting of the sighting means 30 and therefore requiring the mounting of the same on the lid of the truck. In all cases an outer end portion 58 of the pointer guide 52 must be substantially vertically positioned over the ball member 14. Therefore, the mounting bracket 32 must be sufficiently adjustable to compensate for the various possible mounting positions on the towing vehicle 18 and the various posible locations of the ball member 14. For example, the mounting bracket 32 may be attached to a nearly vertical back of a truck or, alternatively, the bracket 32 may have to be attached to a nearly horizontal trunk lid. In either case, the end portion 58 must be adjustable so as to be vertically positioned over the ball member 14 and to be at a height which makes the same visible to the driver of the towing vehicle 18. The pivotal relationship of the extention arm 40 in combination with the sliding relationship of the pointer guide 52 provides sufficient adjustments so as to allow the proper positioning of the end portion 58 of the pointer guide 52.

As can be visualized from FIG. 2, the extension arm 40 normally is rotated downward in a clockwise direction as the slant of the surface on which the mounting bracket 32 approaches a more horizontal disposition. Normally, as the mounting bracket is positioned in a more horizontal disposition, the vertex 42 of the same is horizontally positioned further from the ball member 14; hence, the pointer guide 52 must be positioned further along the extension arm 40. In summary, the combination of the slidable pointer guide 52 and the pivotal extention arm 40, which pivots in a vertical plane, allows for the proper adjustment of the pointer guide 52 over a wide range of slants of the mounting bracket 32 and distances from the ball member 14.

As shown in FIG. 2, the end portion 44 has a plurality of indicia marks 60 designated on the face thereof. Consequently, as the extension arm 40 is rotated with respect to the support bracket 50, the operator may obtain a visual indication of the amount of rotation required of the extention arm 40. A given amount of rotation of the extention arm 40 as specified by the number of indicia marks 60 passed roughly correlates with the distance that the pointer guide 52 must be moved along the extension arm 40. Therefore, adjustment of the sighting means 30 may be made easier.

In operation, the sighting means 30 is typically mounted on the rear, front, or trunk lid of the towing vehicle 18. Alignment of the sighting means 30 along the lateral dimensions of the towing vehicle may be greatly facilitated by the operator visually aligning the vertex 42 of the mounting bracket 32 with a centrally positioned fixture, such as a trunk lock or lettering commonly found on the rear of most towed vehicles. 20. Consequently, the space between the two legs of the V-shaped mounting bracket 32 not only allows for the protrusion of objects that would normally prevent the positioning of a solid piece, but such space also creates the vertex 42 that may be used to align the bracket 32. Once the sighting means 30 has been magnetically attached to the towing vehicle 18, the extension arm 40 is pivotally moved and the pointer guide 52 is slidingly moved until the end portion 58 is substantially positioned over the ball member 14. Next, the towing vehicle 18 is backed up until the pointer guide 52 is ideally, but not necessarily, in contact with the upper end portion 26 of the target post 24. When this occurs, the operator will know that the ball member 14 and the socket member 16 are vertically aligned. Optionally, the end of the pointer guide 52 can be aligned so that it is flush with the far side of the target post 24 relative to the towing vehicle 18 when the ball member 14 and the socket member 16 are precisely aligned. By virtue of this overlapping relationship, the pointer guide 52 will engage the target post 24 just prior to a proper alignment and as it approaches the proper alignment, the pointer guide 52 bends slightly and quivers; thereby giving a visual indication that the proper alignment is about to be achieved. Subsequently, the pointer guide 52 is pushed to the side of the target post 24 and ends up substantially flush with the far side of the same. The pointer guide 52 is preferably made out of a flexible material, such as plastic, which allows this bending and quivering action. Generally, this requires the pointer guide 52 to have a flat configuration which allows it to bend in a vertical direction. Moreover, the extention arm 40 is normally formed of a flexible material, such as plastic, fiberglass, or a thin metal and has a flat configuration which allows it to bend in the horizontal direction. When the operator no longer needs the sighting means 30 it may be folded up and anchored to a metal surface, such as the trunk lid inside of the trunk for the purposes of storage.

Figure 3:
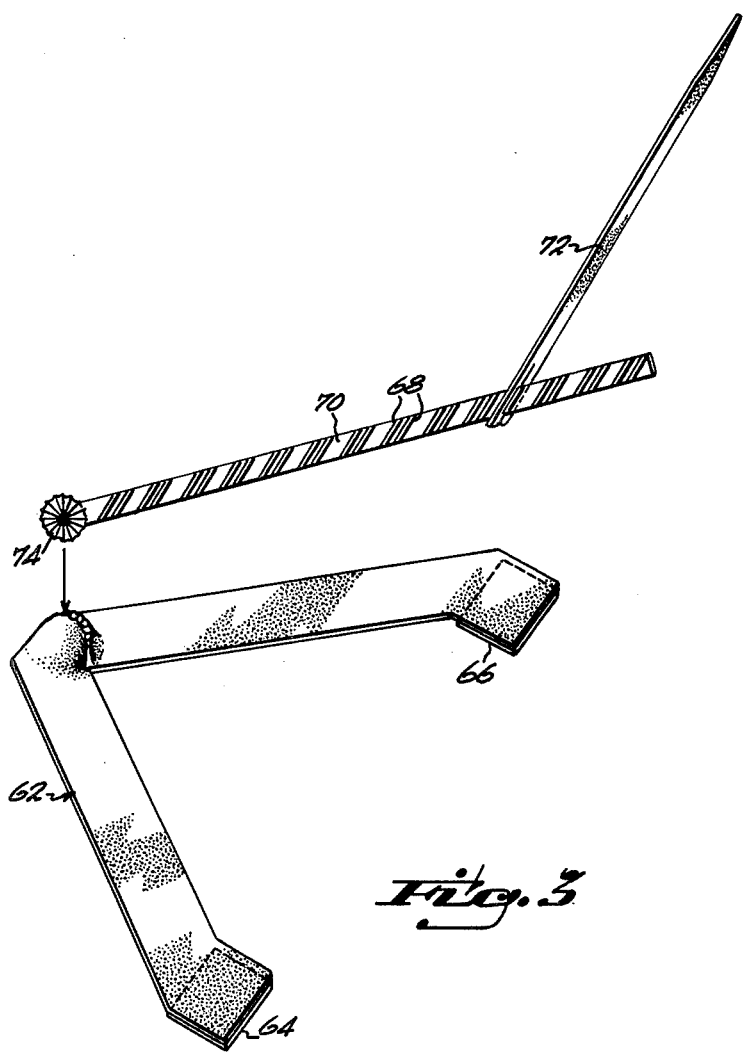
FIG. 3 shows an enlarged, partially exploded view of an alternative embodiment of the sighting means.

Referring to FIG. 3, a second embodiment of the sighting means 30 is illustrated. In this embodiment a V-shaped mounting bracket 62 is formed of a flexible material with a pair of magnetic fastener means 64 and 66 positioned on the outer ends of the V-shaped mounting bracket 62. By reason of the flexible nature of the bracket 62, the need for the pivotal connection of the fastner means shown in the first embodiment is eliminated. Consequently, if the mounting bracket 62 is centrally attached to an outwardly protruding V-shaped rear trunk surface, for example, the legs of the V-shaped mounting bracket 62 would twist sufficiently to allow the magnetic fasteners 64 and 66 to securely attach to the surface. A plurality of ridges 68 angularly traverse opposed sides of an extension arm 70 so as to detachably lock a guide pointer 72 in a selected position along the extension arm 70. A plurality of catches 74 allow for the extension arm 70 to be secured in preselected fixed relationship to the mounting bracket 32 which has corresponding catches to receive the catches 74. In all other respects, this second embodiment is the same as the first embodiment.

Figure 4:
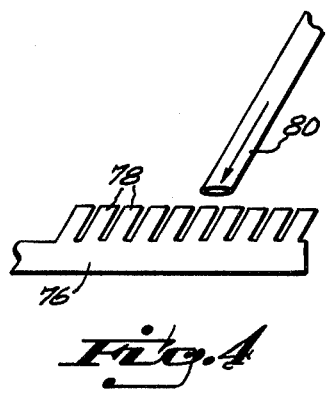
FIG. 4 shows an alternative embodiment of an extention arm and guide pointer of the sighting means.

In a third embodiment of the present invention shown in FIG. 4, an extension arm 76 is formed with a plurality of preferably parallel protrusions 78 which may be used to mount a guide pointer 80, such pointer 80 having a strawlike configuration at one end so as to detachably mount on the protrusions 78. In other respects, this embodiment may be like either previously described embodiments 1 or 2.

It should be appreciated that once the sighting means 30 has been adjusted for a specific towing vehicle 18 and then removed, each time the sighting means 30 is set up thereafter, it is a much simpler manual operation. More specifically, upon initially setting up the sighting means 30, the extension arm 40, 70, or 76 is shortened so that the same terminates just past the mounting position of the pointer guide 52, 72, or 80 respectively. This provides a permanent record of the proper position of the pointer guide 52, 72, or 80. Moreover, as previously mentioned, the enlarged circular end portion 44 of the extension arm 40, 70, or 76 may be provided with indicia marks 60. These marks provide a visual record of the correct pivotal position of the extension arm 40, 70, or 76. After the initial determination of these relationships, they can be readily reinstituted upon subsequent set-ups.

It should also be understood that several of the prior art guide assemblies have a guide member mounted on the ball member or the ball carrying arm which connects to the towing vehicle. However, many trailer hitches are mounted so far under the rear of the towing vehicle, that these mounting positions for the guide member are not available. Therefore, the present invention is particularily useful when incorporated with pre-existing hitch assemblies which do not provide mounting positions for the guide member. More specifically, the sighting means 30 may be mounted on the trunk lid or the rear of the towing vehicle 18.

Although particular embodiments of the invention have been shown and described in full here, there is no intention to thereby limit the invention to the details of such embodiments. On the contrary, the intention is to cover all modifications, alternatives, embodiments, usages and equivalents of the subject invention as fall within the spirit and scope of the invention, specification and the appended claims.

What is claimed is:

1. A hitch guide assembly for aligning a pair of coupling members of a hitch used to couple a towing vehicle to a towed vehicle, said hitch guide assembly comprising;

a target post adapted for mounting on the towed vehicle, a mounted bracket adapted for detachable attachment to said towing vehicle, an extension arm pivotally connected by an end portion to said mounting bracket for rotation in a plane disposed in substantially perpendicular relationship to said mounting bracket, a guide pointer secured to said extension arm and capable of longitudinal adjustment along said extension arm, locking means for securing said guide pointer in a selected fixed position along the longitudinal dimensions of said extension arm, said mounting bracket having a substantially V-shaped configuration defining a vertex,
said extension arm being pivotally connected at said vertex of said V-shaped mounting arm,
said V-shaped mounting bracket defining two legs with a magnetic fastner being positioned on an end portion of each said leg,
said end portion of said extension arm which is pivotally attached having at least one indicia mark thereon for providing a visual aid to pivotally position said extension arm with respect to said mounting bracket,
said extension arm disposed in angled relationship relative to said guide pointer.

2. In the hitch guide assembly of claim 1,
said locking means for securing said guide pointer including a plurality of holes spaced along the longitudinal dimensions of said extension arm.

3. In the hitch guide assembly of claim 2,
said guide pointer having a jacket end portion for slidingly receiving said extension arm.

4. In the hitch guide assembly of claim 1,
said locking means for securing said guide pointer including a plurality of spaced parallel ridges form on at least one side of said extension arm.

5. In the hitch guide assembly of claim 4,
said guide pointer having a jacket end portion for slidingly receiving said extension arm.

6. In the hitch guide assembly of claim 1,
said target post having an upper end portion capable of being vertically centered above the coupling member of the towed vehicle.

7. In the hitch guide assembly of claim 1,
said guide pointer having an outer end portion substantially centered above the coupling member of the towing vehicle.

8. In the hitch guide assembly of claim 7,
said guide pointer and said extension arm being composed of a flexible material,
whereby said guide pointer bends to one side when engaged by the concoming target post.

9. In the hitch guide assembly of claim 8,
said guide pointer having an outer end disposed slightly past the center of the coupling member on the towing vehicle,
whereby said guide pointer bends to one side of the target post and therefore provides a visual signal when the coupling members are vertically aligned.

10. A hitch guide assembly for aligning a pair of coupling members of a hitch used to couple a towing vehicle to a towed vehicle, said hitch guide assembly comprising:
a target post adapted for mounting on the towed vehicle,
a mounted bracket adapted for detachable attachment to said towing vehicle,
an extension arm pivotally connected to said mounting bracket for rotation in a plane disposed in substantially perpendicular relationship to said mounting bracket,
a guide pointer secured to said extension arm and capable of longitudinal adjustment along said extension arm,
said extension arm disposed in angled relationship relative to said guide pointer,
said mounting bracket having a pair of spaced-apart, pivotally mounted magnetic fasteners,
said mounting bracket comprising two angled legs with said extension arm being pivotally connected at the juncture of said legs,
one of said pair of magnetic fasteners being disposed on the end portion of each said leg.

* * * * *